US 6,684,717 B2

(12) United States Patent
Jiang et al.

(10) Patent No.: US 6,684,717 B2
(45) Date of Patent: *Feb. 3, 2004

(54) HIGH RESOLUTION PRESSURE-SENSING DEVICE HAVING AN INSULATING FLEXIBLE MATRIX LOADED WITH FILLER PARTICLES

(75) Inventors: Tongbi Jiang, Boise, ID (US); Zhiqiang Wu, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 120 days.

This patent is subject to a terminal disclaimer.

(21) Appl. No.: 09/922,966

(22) Filed: Aug. 6, 2001

(65) Prior Publication Data

US 2001/0052267 A1 Dec. 20, 2001

Related U.S. Application Data

(62) Division of application No. 09/592,737, filed on Jun. 13, 2000, now Pat. No. 6,363,796, which is a division of application No. 08/906,583, filed on Aug. 5, 1997, now Pat. No. 6,073,497.

(51) Int. Cl.$^7$ ................................................. G01D 7/00
(52) U.S. Cl. ................................................. 73/862.046
(58) Field of Search ........................ 73/862.68, 862.04, 73/862.06, 862.046; 364/556

(56) References Cited

U.S. PATENT DOCUMENTS

| | | | |
|---|---|---|---|
| 4,021,776 A | 5/1977 | Tech | 340/146.3 MA |
| 4,296,406 A | 10/1981 | Pearson | 340/166 |
| 4,302,361 A | 11/1981 | Kotani et al. | 252/503 |
| 4,389,711 A | 6/1983 | Hotta et al. | 364/556 |
| 4,775,765 A | 10/1988 | Kimura et al. | 178/18 |
| 5,060,527 A | 10/1991 | Burgess | 73/862.68 |
| 5,447,074 A | 9/1995 | Polaert et al. | 73/862.041 |
| 5,526,701 A | 6/1996 | Tamori | 73/862.046 |
| 6,073,497 A | 6/2000 | Jiang et al. | 73/862.68 |

OTHER PUBLICATIONS

09/528,944 Jiang et al, High resolution pressure sensing device having an insulating flexible marix loaded with filler particles, Mar. 2000.*
09531,612 Jiang et al, High resolution pressure sensing device having an insulating flexible marix loaded with filler particles, Mar. 2000.*
Aharoni, S., "Electrical Resistivity of a Composite of Conducting Particles in an Insulating Matrix", *J. Appl. Phys.*, 43, 2463–2465, (May 1972).
Lai, Z., et al., "Anisotropically Conductive Adhesive Flip–Chip Bonding on Rigid and Flexible Printed Circuit Substrates", *IEEE Trans. on Components, Packaging, and Manufacturing Technology—Part B*, 19, 644–660, (Aug. 1996).
Li, L., et al., "Electrical Conduction Models for Isotropically Conductive Adhesive Joints", *IEEE Trans. on Components, Packaging, and Manufacturing Technology—Part A*, 20, 3–8, (Mar. 1997).
Li, L., et al., "Electrically Conducting Powder Filled Polyimidesiloxane", *Composites*, 22, 211–218, (May 1991).

* cited by examiner

*Primary Examiner*—Edward Lefkowitz
*Assistant Examiner*—Jewel V. Thompson
(74) *Attorney, Agent, or Firm*—Schwegman, Lundberg, Woessner & Kluth, P.A.

(57) ABSTRACT

A high-resolution pressure-sensing device is disclosed. The device includes an insulating flexible matrix having a plurality of filler particles. Application of a force to the matrix causes compression of the matrix. This results in the filler particles occupying a greater amount of space within the matrix relative to when no force is applied. A detector attached to the matrix detects or measures the volume of the filler particles relative to the volume of the matrix, and therefore determines the force applied to the matrix. Preferably, the resistivity of the matrix is inversely proportional to the volume percent of the filler particles, in which case the detector is a resistance-measuring circuit.

42 Claims, 3 Drawing Sheets

HIGH RESOLUTION PRESSURE-SENSING DEVICE HAVING AN INSULATING FLEXIBLE MATRIX LOADED WITH FILLER PARTICLES

This application is a Divisional of U.S. application Ser. No. 09/592,737, filed Jun. 13, 2000 now U.S. Pat. No. 6,363,796, which is a Divisional of U.S. application Ser. No. 08/906,583 filed Aug. 5, 1997, now U.S. Pat. No. 6,073,497, both prior U.S. patent applications are herein incorporated by reference.

FIELD OF THE INVENTION

This invention relates generally to high resolution pressure-sensing devices, and more particularly to such devices having an insulating flexible matrix loaded with filler particles.

BACKGROUND OF THE INVENTION

It is known within the art that the resistance of an insulating matrix loaded with conductive particles decreases as the volume of conductive particles relative to the volume of the matrix increases. For example, as reported in Shaul M. Aharoni, "Electrical Resistivity of a Composite of Conducting Particles in an Insulating Matrix," 43 Journal of Applied Physics 2463 (1972), which is hereby incorporated by reference, when the volume percent of conductive particles (defined as the volume of the conductive particles as a percentage of the volume of the matrix) for one particular composition is between approximately ten and twenty percent, the resistivity of the insulating matrix decreases substantially logarithmically. The Aharoni reference describes an experiment in which samples of a polymeric material are prepared such that each is loaded with a different amount of a metal material. The resistance of each material is then measured to ultimately derive the observed relationship between volume percent of conductive particles and resistance of the insulating matrix.

This phenomenon has subsequently been observed in other environments, as is shown by the research reported in Li Li and James E. Morris, "Electrical Conduction Models for Isotropically Conductive Adhesive Joints," IEEE Transactions on Components, Packaging, and Manufacturing Technology, Part A, Volume 20, Number 1, March 1997. However, it is not believed that the observed relationship has been put to useful technological applications. A significant limitation in doing so is the manner in which the Aharoni experiment is conducted. Each different sample of polymeric material, once loaded with conductive filler particles, yields an unchanging and nondynamic resistivity. Although interesting from a purely scientific standpoint to derive the observed relationship between volume percent of conductive particles and resistance of the polymeric material, this permanence in resistivity makes the phenomenon less than practical for useful applications. This may be a reason why useful innovations relying on the phenomenon is believed to not abundantly exist.

SUMMARY OF THE INVENTION

The above-described shortcomings are addressed by the present invention, which will be understood by reading and studying the following specification. The invention describes a pressure-sensing device having an insulating flexible matrix into which a plurality of filler particles are loaded. The matrix is flexible, so that its volume decreases as a force applied to the matrix increases. The volume ratio of the filler particles relative to the matrix therefore increases as the applied force increases. This results in the resistance of the matrix decreasing as the applied force increases, according to a preferred embodiment.

The novel pressure-sensing device is not limited by its potential applications. Embodiments described herein include a high-resolution pattern recognition device, and a pressure-sensitive cold-cathode display (CCD). Still other and further aspects, embodiments and advantages of the present invention will become apparent by reference to the accompanying drawings and by reading the following detailed description.

DETAILED DESCRIPTION OF THE DRAWINGS

In the following detailed description of the preferred embodiments, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the appended claims.

Overview of the Invention

Figure 1A:
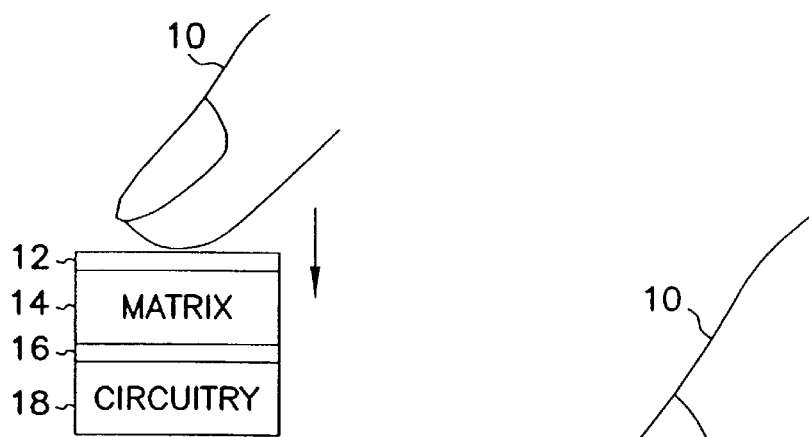
FIG. 1(a) is a diagram showing the operation of one embodiment of the invention.

A diagram illustrating the operation of an embodiment of the invention is shown in FIG. 1(a). A force is applied by finger 10 to bonding pads 12. Note that finger 10 is one example of a contacting subject that can apply force; the invention is not so limited. Underlying bonding pads 12 is insulating flexible matrix 14. The force applied by finger 10 compresses matrix 14. In other words, the volume of matrix 14 decreases as a result of the applied force. Matrix 14 is loaded with a plurality of conductive filler particles, not shown in FIG. 1(a). As matrix 14 is compressed, the filler particles take up a relatively greater amount of space within matrix 14, and the volume of the filler particles relative to the volume of matrix 14 increases (i.e., the volume percent of filler particles increases). Preferably, this results in a decrease in the resistivity of matrix 14. Underlying matrix 14 are bonding pads 16, and underlying pads 16 is circuitry 18. Circuitry 18 desirably measures, but also may detect, the decrease in resistivity of matrix 14 as the force is applied. That is, circuitry 18 is a detector determining the volume of the filler particles relative to the volume of the matrix.

Matrix 14 is compressed by the force applied by finger 10 such that the matrix has a resistance distribution responsive to the contour profile of the finger. Because finger 10 is not an inherently level surface, the force applied by the finger onto bonding pads 12 varies with the contour of the surface of the finger (that is, the finger print). The resulting resistance of matrix 14 therefore locally varies in correspondence with the contour of the finger print, such that matrix 14 has a resistance distribution corresponding to the finger print. That is, the resistance at each point on matrix 14 is dependent on the force applied to the matrix at that point. Because the force applied to matrix 14 is necessarily not constant over all points of the matrix in cases where the force results from a contacting subject that has an uneven contour profile (such as a finger print), matrix 14 has a resistance distribution corresponding to the contour profile. Circuitry 18 desirably measures, but at least detects, this resistance distribution.

Figure 1B:
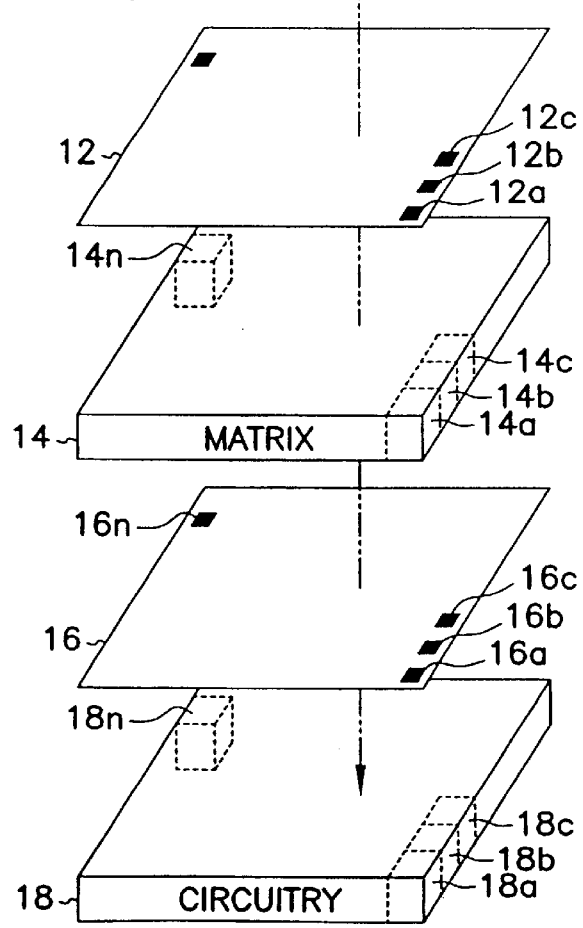
FIG. 1(b) is a diagram showing an exploded view of FIG. 1 in more detail.

This is better illustrated by reference to FIG. 1(*b*), which is a diagram showing an exploded view of FIG. 1(*a*) in more detail. Finger 10 presses against bonding pads 12*a* . . . 12*n*, where n is the total number of bonding pads 12. The total number of pads 12 dictates the resolution of the pressure-sensing device. The greater the number of bonding pads 12, the greater the detail in which the resistance distribution of matrix 14 reflects the contour profile of finger 10. In a preferred embodiment, an array of bonding pads is disposed within a surface having an area of ten millimeters by ten millimeters, which provides a resolution sufficient to permit the accurate rendering of a contour profile as a resistance distribution. In the embodiment shown in FIG. 1(*b*), there is also a corresponding n bonding pads 16 underlying matrix 14, such that bonding pad 16*a* corresponds to bonding pad 12*a*, etc. Circuitry 18 measures, but at least detects, the change in the resistance of matrix 14 between each corresponding pair of one of bonding pads 12 and one of bonding pads 16.

In a preferred embodiment, each set of a corresponding pair of one of bonding pads 12 and one of bonding pads 16, along with a section of matrix 14 between the pair of bonding pads, and a corresponding circuit of circuitry 18 that desirably measures, but at least detects, the change in the resistance of the section of matrix 14 between the pair of bonding pads, constitute a single pressure-sensing device. For example, as shown in FIG. 1(*b*), one such pressure-sensing device is made up of bonding pad 12*a*, matrix section 14*a*, bonding pad 16*a*, and circuit 18*a*. The embodiment of the invention illustrated in FIG. 1(*a*) and FIG. 1(*b*) can thus be conceptualized in two different ways. First, the embodiment includes an electrical pressure-sensitive grid of an array of pressure-sensing devices, where each pressure-sensing device includes a pair of bonding pads, a section of a matrix, and a circuit of the circuitry to measure or detect the resistance change of the matrix section between the bonding pads pair. Second, the embodiment includes a contacting phase layer, which is a layer of bonding pads overlaying a layer of insulating matrix so that the contour profile of a finger is reflected as a resistance distribution on the matrix, and a circuitry phase layer, which is a layer of bonding pads underlying the matrix and an underlying circuitry layer to measure or detect the resistance distribution (that is, to translate the resistance distribution into a measurable pressure contour distribution). The following section describes in more detail different embodiments of a single pressure-sensing device.

Specific Embodiments of a Pressure-Sensing Device

Three different embodiments of a pressure-sensing device are shown in FIGS. 2(*a*), 2(*b*), and 2(*c*). Referring first to FIG. 2(*a*), insulating matrix 20 has loaded therein a plurality of conductive filler particles and is disposed between top electrode 22 and bottom electrode 24. In the case where the pressure-sensing device is manufactured so that it has a small form factor, each of electrodes 22 and 24 is a bonding pad, although the invention is not so limited. To protect the entire device from damage, a protective film 26 overlays top electrode 22. The invention is not limited to a particular type of film. Circuit 28 is operatively coupled to electrodes 22 and 24, so that the change in the resistance of the part of matrix 20 between the electrodes is measured or detected. The invention is not limited to any particular enablement of circuit 28, and such resistance-measuring circuits are known within the art. Where a small form factor of the pressure-sensing device is required, circuit 28 is preferably built as an integrated circuit. The resistance of matrix 20 preferably decreases in an inversely proportional manner according to the force applied along the z axis as is shown in FIG. 2(*a*).

Referring next to FIG. 2(*b*), a pressure-sensing device according to another embodiment of the invention is shown. Insulating matrix 30 has loaded therein a plurality of conductive filler particles. On the top surface of matrix 30 is protective film 31, to protect the device from damage. Electrodes 32 and 34 are disposed into the bottom surface of matrix 30, such that a section of matrix 30 separates the two electrodes. Circuit 36 is operatively coupled to the electrodes, and measures or detects the change in the resistance of the section of matrix 30 between the two electrodes. As force is applied along the z axis to matrix 30, the resistance of the section of the matrix between electrodes 32 and 34 decreases along the x axis as shown. The invention is not limited to any particular enablement of circuit 36, and such resistance-measuring circuits are known within the art. As is the case with the embodiment of FIG. 2(*a*), where a small form factor is required, the electrodes of FIG. 2(*b*) are bonding pads, and the circuit is preferably built as an integrated circuit.

The difference between the embodiment shown in FIG. 2(*b*) and the embodiment shown in FIG. 2(*a*) is that the embodiment of FIG. 2(*b*) does not have a top electrode. This provides for easier manufacture of this embodiment. A top electrode does not have to be built on top of the insulating matrix, and more significantly, the circuit does not have to be coupled to a top electrode. Instead, the circuit operatively couples two bottom electrodes. Because the circuit itself is preferably disposed below the electrodes, the location of the circuit is conveniently suited for easy coupling to the electrodes.

Figure 2A:
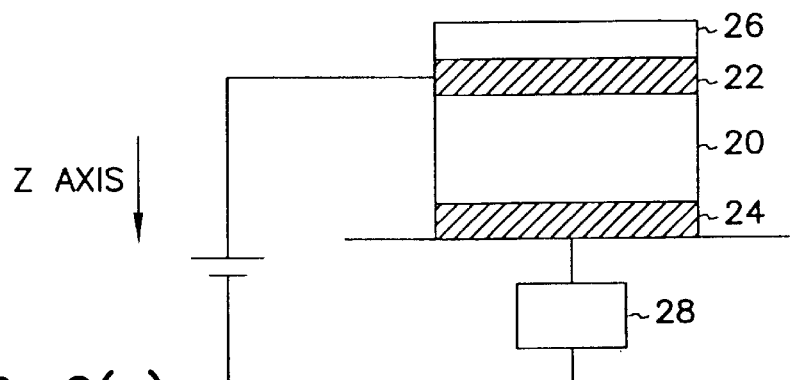
FIG. 2(a) is a diagram of a pressure-sensing device of one embodiment of the invention.
Figure 2B:
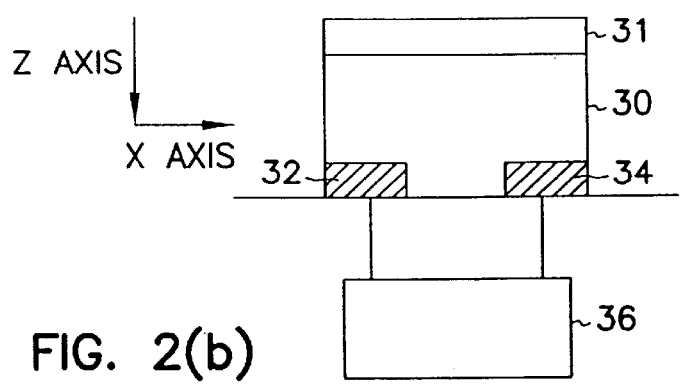
FIG. 2(b) is a diagram of a pressure-sensing device of another embodiment of the invention.
Figure 2C:
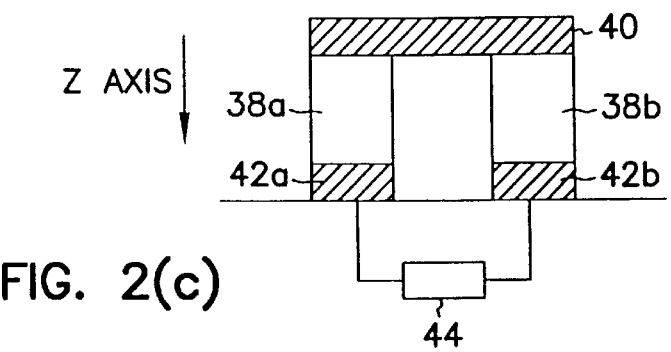
FIG. 2(c) is a diagram of a pressure-sensing device of still another embodiment of the invention.

Referring finally to FIG. 2(*c*), a pressure-sensing device according to still another embodiment of the invention is shown. Insulating matrix sections 38*a* and 38*b* make up an insulating matrix. In each section the matrix has loaded therein a plurality of conductive filler particles. Electrode 40 spans the top surface of each of sections 38*a* and 38*b*. Electrode 42*a* underlies the bottom surface of section 38*a*, while electrode 42*b* underlies the bottom surface of section 38*b*. Circuit 44 is operatively coupled to electrodes 42*a* and 42b. As force is applied along the z axis to sections 38a and 38b, the resistance of the sections decreases along the z axis. The invention is not limited to any particular enablement of circuit 44, and such resistance-measuring circuits are known within the art. As is the case with the embodiments of FIG. 2(a) and FIG. 2(b), where a small form factor is required, the electrodes of FIG. 2(c) are bonding pads, and the circuit is preferably built into an integrated circuit.

The embodiment shown in FIG. 2(c) is similar to that shown in FIG. 2(b) in that the circuit does not operatively couple a top electrode. However, unlike the embodiment of FIG. 2(b), the embodiment of FIG. 2(c) still has a top electrode. The top electrode of FIG. 2(c), however, serves only to close an electrical loop among circuit 44, electrode 42a, section 38a, electrode 40, section 38b, and electrode 42b. Moreover, the circuit of FIG. 2(c) measures or detects the change in the resistance across the insulating matrix along the same axis along which force is applied to the matrix; the circuit of FIG. 2(b) measures or detects the change in the resistance across a perpendicular axis. Therefore, the embodiment of FIG. 2(c) may be more robust. However, because the matrix is not a continuous layer—that is, there is a gap between sections of the matrix—the embodiment of FIG. 2(c) may be more difficult to manufacture.

Composition of the Flexible Insulating Matrix

Figure 3:
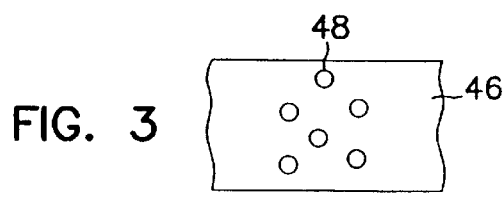
FIG. 3 is a diagram showing in detail an insulating matrix loaded with filler particles according to an embodiment of the invention.

Referring now to FIG. 3, the flexible insulating matrix described in the previous sections is shown in more detail. Flexible insulating matrix 46 has conductive filler particles 48 loaded therein. Filler particles 48 are preferably distributed evenly throughout matrix 46. The invention is not limited to any particular material for either matrix 46 or filler particles 48. Contemplated materials for the insulating matrix include rigid polymeric materials such as polyimidesiloxane, or, flexible elastic polymeric materials such as polyurethane and silicone. The matrix material may also be replaced by viscous organic materials or polymers. The filler particles preferably are able to recover to their original position when force is released from the matrix. Contemplated materials for the filler particles include silver, iron, nickel, and metal-coated polystyrene or other polymer materials. The materials for the matrix and the filler particles are preferably selected such that the resulting matrix with loaded filler particles has a resistivity property such that the resistance decreases substantially logarithmically as force applied to the matrix increases.

When force is applied to matrix 46, the matrix is compressed. This result in a reduction of volume of matrix 46. Filler particles 48 therefore occupy a greater amount of space within matrix 46 as compared to when force is not applied to the matrix. That is, the volume percent of the filler particles increases as force is applied to the matrix The resistivity of the matrix is inversely proportional to the volume percent of the filler particles, and therefore is inversely proportional to the force applied to the matrix as well. In a preferred embodiment, the matrix has a resistance-change-to-pressure value of $4\%/(g/mm^2)$, which is the absolute change in resistance divided by the absolute change of pressure within the region of operation between 100 $g/mm^2$ and 0 $g/mm^2$.

Specifics Applications of the Invention

Figure 4A:
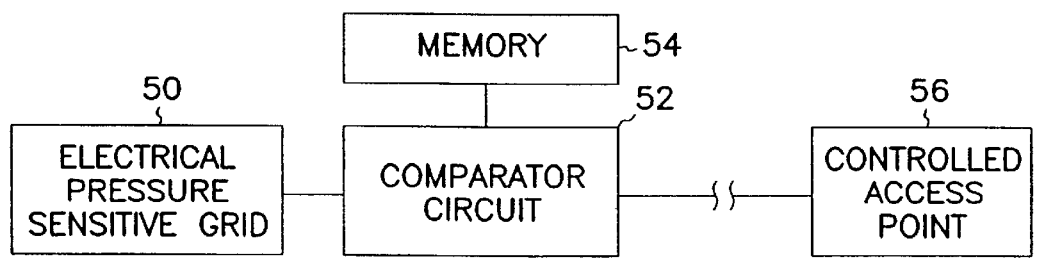
FIG. 4(a) is a block diagram of a pattern recognition system, such as a finger print identification system, utilizing an embodiment of the invention; and, FIG. 4(b) is a diagram of a pressure-sensitive cold-cathode display (CCD) utilizing an embodiment of the invention.
Figure 4B:
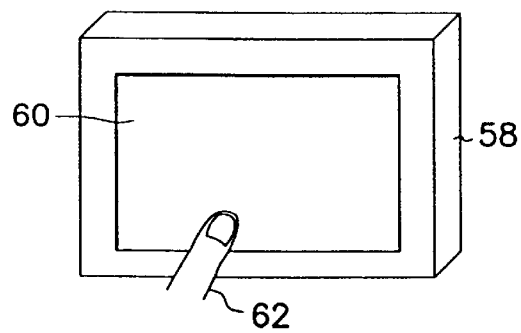

The invention as has been described is not particularly limited to any given application. Two contemplated applications include a pattern recognition system (such as a finger print identification system), and a pressure-sensitive cold cathode display (CCD). These applications are illustrated in FIG. 4(a) and FIG. 4(b). Referring first to FIG. 4(a), a block diagram of a pattern recognition system that utilizes an embodiment of the invention is shown. Pattern recognition systems are known within the art, and the block diagram of FIG. 4(a) is shown in greatly simplified detail only to illustrate how an embodiment of the present invention may be integrated within such a system. With specific respect to finger print identification systems, such prior art systems it is believed rely on optical exposure and image digitizing technology, which are very expensive relative to such a system utilizing an embodiment of the invention.

Electrical pressure-sensitive grid 50 is a grid of pressure-sensing devices according to an embodiment of the invention. That is, the grid includes an insulating matrix into which filler particles are loaded, such that the contour profile of a contacting subject pressed against the matrix results in the matrix having a corresponding resistance distribution on the matrix. Comparator circuit 52 is operatively coupled to grid 50, and matches the resistance distribution that is output by grid 50 with distributions previously stored in memory 54. The construction of such comparator circuits and memories are known within the art; it is contemplated that both are preferably part of a multi-purpose computer programmed as a pattern recognition system. Comparator circuit 52, if matching the resistance distribution from grid 50 with one stored in memory 54, typically initiates an event. As shown in FIG. 4(a), circuit 52 is operatively coupled to controlled access point 56. Therefore, upon determining a match, circuit 52 initiates the event of permitting access to point 56, which may be a locked entryway, etc. Pattern recognition systems are not limited to such uses, however, and the invention is also not so limited.

Referring next to FIG. 4(b), a diagram of a pressure-sensitive cold-cathode display (CCD) utilizing an embodiment of the invention is shown. Pressure-sensitive CCD's are also known within the art, and the diagram of FIG. 4(b) is shown in greatly simplified detail only to illustrate how an embodiment of the present invention may be integrated within such a display. While it is believed that resistive-based pressure-sensitive displays may be known within the art, the present invention utilizes a novel approach to effectuate pressure sensitivity and thus affords such displays a resolution that heretofore, it is believed, have not been possible.

CCD 58 includes touch screen 60, into which is integrated an electrical pressure-sensitive grid according to an embodiment of the invention. CCD 58 is typically operatively coupled to a computer, which is not shown in FIG. 4(b). Touch screen 60 displays visual information sent by the computer. Therefore, the electrical pressure-sensitive grid that is integrated within the touch screen is necessarily sufficiently transparent so that the information is visible. The electrical pressure-sensitive grid acts as a pointing device for the computer. A user of the computer is able to select a region on touch screen 60 by pressing a finger 62 against the touch pad with sufficient force to decrease the resistance of a section of the grid integrated into the screen. Information pertaining to the location on the grid at which the decrease in resistance has occurred is sent to the computer, which is then able to act on this information. In this manner, the pressure-sensitive CCD is able to substitute or supplement other pointing devices that may be attached to the computer, such as a mouse or a trackball.

Conclusion

A high-resolution pressure-sensing device having an insulating flexible matrix loaded with filler particles has been described. Force applied to the matrix compresses the matrix, which results in an increase in the volume percent of the filler particles. In embodiments conforming to the phenomenon observed in the Aharoni reference, this increase in volume percent decreases the resistivity of the matrix. Several specific embodiments for high-resolution pressure-sensing devices in accordance with the invention have been described. Furthermore, two specific applications of these devices—a pattern recognition system and a pressure-sensitive CCD—have been described. Therefore, although specific embodiments of the invention have been illustrated and described herein, it will be appreciated by those of ordinary skill in the art that any arrangement which is calculated to achieve the same purpose may be substituted for the specific embodiments shown. This application is intended to cover any adaptations or variations of the present invention. It is manifestly intended that this invention be limited only by the following claims and equivalents thereof.

We claim:

1. A method of detecting pressure comprising:
   detecting change in a resistance of a matrix into which a plurality of conductive filler particles are loaded, the resistance decreasing as a force applied to the matrix increases; and
   developing a contour profile by comparing the resistance of a plurality of adjacent matrixes.

2. A method of detecting pressure comprising:
   detecting change in a resistance of a matrix into which a plurality of conductive filler particles are loaded, the resistance decreasing as a force applied to the matrix increases; and
   providing a resistance distribution.

3. The method of claim 2 wherein providing the resistance distribution comprises providing the resistance distribution corresponding to a contour profile.

4. The method of claim 2 wherein the force applied is by a contacting subject and wherein providing the resistance distribution comprises providing the resistance distribution corresponding to a contour profile of the contacting subject.

5. A method of detecting pressure comprising:
   detecting change in a resistance of a matrix along an axis perpendicular to an axis along which a force is applied to the matrix into which a plurality of conductive filler particles are loaded, the resistance decreasing as the force applied to the matrix increases; and
   providing a resistance distribution.

6. The method of claim 5 wherein providing the resistance distribution comprises providing the resistance to a contour profile.

7. The method of claim 5 wherein the force applied is by a contacting subject and wherein providing the resistance distribution comprises providing the resistance distribution corresponding to a contour profile of the contacting subject.

8. A method of detecting pressure comprising:
   detecting change in a resistance of a matrix along an axis coincidental to an axis along which a force is applied to the matrix into which a plurality of conductive filler particles are loaded, the resistance decreasing as the force applied to the matrix increases; and
   providing a resistance distribution.

9. The method of claim 8 wherein providing the resistance distribution comprises providing the resistance distribution corresponding to a contour profile.

10. The method of claim 8 wherein the force applied is by a contacting subject and wherein providing the resistance distribution comprises providing the resistance distribution corresponding to a contour profile of the contacting subject.

11. A method of detecting pressure comprising:
    providing an array of pressure sensing units of an insulating flexible matrix;
    detecting change in a resistance of the matrix into which a plurality of conductive filler particles are loaded, the resistance decreasing as a force applied to the matrix increases; and
    providing a resistance distribution.

12. The method of claim 11 wherein providing the resistance distribution comprises providing the resistance distribution corresponding to a contour profile.

13. The method of claim 11 wherein the force applied is by a contacting subject and wherein providing the resistance distribution comprises providing the resistance distribution corresponding to a contour profile of the contacting subject.

14. A method of detecting pressure comprising:
    providing an array of pressure sensing units of an insulating flexible matrix;
    detecting change in a resistance of the matrix along an axis perpendicular to an axis along which a force is applied to the matrix into which a plurality of conductive filler particles are loaded, the resistance decreasing as the force applied to the matrix increases; and
    providing a resistance distribution.

15. The method of claim 14 wherein providing the resistance distribution comprises providing the resistance distribution corresponding to a contour profile.

16. The method of claim 14 wherein the force applied is by a contacting subject and wherein providing the resistance distribution comprises providing the resistance distribution corresponding to a contour profile of the contacting subject.

17. A method of detecting pressure comprising:
    providing an array of pressure sensing units of an insulating flexible matrix;
    detecting change in a resistance of the matrix along an axis coincidental to an axis along which a force is applied to the matrix into which a plurality of conductive filler particles are loaded, the resistance decreasing as the force applied to the matrix increases; and
    providing a resistance distribution.

18. The method of claim 17 wherein providing the resistance distribution comprises providing the resistance distribution corresponding to a contour profile.

19. The method of claim 17 wherein the force applied is by a contacting subject and wherein providing the resistance distribution comprises providing the resistance distribution corresponding to a contour profile of the contacting subject.

20. The method of claim 19 further comprising providing a high-resolution pattern-recognition device.

21. The method of claim 19 further comprising providing a pressure-sensitive cold cathode display.

22. An electrical pressure-sensitive grid comprising:
    an insulating flexible matrix;
    a plurality of conductive filler particles loaded into the matrix, the matrix having a volume percent of filler particles that increases as a force applied to the matrix increases and a resistance that decreases as the volume percent of filler particles increases;
    a circuit operatively coupled to the matrix to detect change in the resistance of the matrix;
    wherein the circuit detects change in the resistance across the one or more sections of the matrix; and
    wherein the circuit provides a resistance distribution.

23. The electrical pressure-sensitive grid of claim 22 wherein the circuit provides the resistance distribution correspomding to a contour profile.

24. The electrical pressure-sensitive grid of claim 22 wherein the force is applied by a contacting subject to the matrix and the circuit provides the resistance distribution corresponding to a contour profile of the contacting subject.

25. An electrical pressure-sensitive grid comprising:
an array of pressure sensing units wherein each unit comprises:
an insulating flexible matrix;
a plurality of conductive filler particles loaded into the matrix, the matrix having a volume percent of filler particles that increases as a force applied to the matrix increases and a resistance that decreases as the volume percent of filler particles increases; and
a circuit operatively coupled to the matrix to detect change in the resistance of the matrix; and
wherein the circuit detects change in the resistance across the one or more sections of the matrix along an axis perpendicular to an axis along which the force is applied to the matrix.

26. The electrical pressure-sensitive grid of claim 25 wherein the array of pressure sensing units produces a resistance distribution corresponding to a contour profile.

27. The electrical pressure-sensitive grid of claim 25 wherein the force is applied by a contacting subject to the matrix and the array of pressure sensing units produces a resistance distribution corresponding to a contour profile of the contacting subject.

28. The electrical pressure-sensitive grid of claim 27, wherein the matrix is operable in a region in which the resistance of the matrix decreases substantially logarithmically in response to the force applied to the matrix.

29. An electrical pressure-sensitive grid comprising:
an insulating flexible matrix;
a plurality of conductive filler particles loaded into the matrix, the matrix having a volume percent of filler particles that increases as a force applied to the matrix increases and a resistance that decreases as the volume percent of filler particles increases;
a circuit operatively coupled to the matrix to measure change in the resistance of the the matrix;
wherein the circuit measures change in the resistance across the one or more sections of the matrix; and
wherein the circuit provides a resistance distribution.

30. The electrical pressure-sensitive grid of claim 29 wherein the circuit provides a resistance distribution corresponding to a contour profile.

31. The electrical pressure-sensitive grid of claim 29 wherein the force is applied by a contacting subject to the matrix and the circuit provides a resistance distribution corresponding to a contour profile of the contacting subject.

32. An electrical pressure-sensitive grid comprising:
an insulating flexible matrix;
a plurality of conductive filler particles loaded into the matrix, the matrix having a volume percent of filler particles that increases as a force applied to the matrix increases and a resistance that decreases as the volume percent of filler particles increases;
a circuit operatively coupled to the matrix to measure change in the resistance of the matrix; and
wherein the circuit measures change in the resistance across the one or more sections of the matrix along an axis perpendicular to an axis along which the force is applied to the matrix.

33. The electrical pressure-sensitive grid of claim 32 wherein the circuit provides a resistance distribution.

34. The electrical pressure-sensitive grid of claim 32 wherein the circuit provides a resistance distribution corresponding to a contour profile.

35. The electrical pressure-sensitive grid of claim 32 wherein the force is applied by a contacting subject to the matrix and the circuit provides a resistance distribution corresponding to a contour profile of the contacting subject.

36. An electrical pressure-sensitive grid comprising:
an array of pressure sensing units wherein each unit comprises:
an insulating flexible matrix;
a plurality of conductive filler particles loaded into the matrix, the matrix having a volume percent of filler particles that increases as a force applied to the matrix increases and a resistance that decreases as the volume percent of filler particles increases;
a circuit operatively coupled to the matrix to measure change in the resistance of the matrix; and
wherein the circuit measures change in the resistance across the one or more sections of the matrix along an axis perpendicular to an axis along which the force is applied to the matrix.

37. The electrical pressure-sensitive of claim 36 wherein the array of pressure sensing units produces a resistance distribution corresponding to a contour profile.

38. The electrical pressure-sensitive grid of claim 37 wherein the force is applied by a contacting subject to the matrix and the array of pressure sensing units produces a resistance distribution corresponding to a contour profile of the contacting subject.

39. The electrical pressure-sensitive grid of claim 38, wherein the matrix is operable in a region in which the resistance of he matrix decreases substantially logarithmically in response to the force applied to the matrix.

40. An apparatus comprising an electrical pressure-sensitive grid of pressure-sensitive devices, each device comprising:
an insulating flexible matrix;
a plurality of conductive filler particles loaded into the matrix, the matrix having a volume percent of filler particles that increases as a force applied by a contacting subject to the matrix increases and a resistance that decreases as the volume percent of filler particles increases;
a circuit operatively coupled to the matrix to measure change in the resistance of the matrix;
wherein the circuit measures change in the resistance across the one or more sections of the matrix along an axis perpendicular to an axis along which the force is applied to the matrix; and
wherein the pressure-sensitive grid provides a resistance distribution corresponding to a contour profile of the contacting subject.

41. The apparatus of claim 40 further comprising
at least a pair of electrodes, each mounted to a different surface of the matrix such that the electrodes effectively span one or ore sections of the matrix;
wherein the circuit is operatively coupled to the electrodes to measure change in the resistance across the one or more sections of the matrix spanned by the electrodes; and
wherein the electrodes are mounted such that the circuit measures change in the resistance across the one or more sections of the matrix along an axis perpendicular to an axis along which the force is applied to the matrix.

42. The apparatus of claim 41 wherein each of the pair of electrodes is mounted to a bottom surface of a corresponding section of the matrix.

* * * * *

UNITED STATES PATENT AND TRADEMARK OFFICE
CERTIFICATE OF CORRECTION

PATENT NO.   : 6,684,717 B2  
DATED        : February 3, 2004  
INVENTOR(S)  : Jiang et al.

It is certified that error appears in the above-identified patent and that said Letters Patent is hereby corrected as shown below:

Column 5,  
Line 50, delete "result" and insert -- results --, therefor,  
Line 54, after "matrix" insert -- . --.  
Line 63, "Specifics" and insert -- Specific --, therefor.

Column 7,  
Line 48, after "resistance" insert -- distribution corresponding --.

Column 8,  
Lines 66-67, delete "correspomding" and insert -- corresponding --, therefor.

Column 9,  
Line 39, delete "the" before "matrix".

Column 10,  
Line 20, after "pressure-sensitive" insert -- grid --.  
Line 30, delete "he" and insert -- the --, therefor,  
Line 54, delete "ore" and insert -- more --, therefor.

Signed and Sealed this

Twentieth Day of April, 2004

JON W. DUDAS  
*Acting Director of the United States Patent and Trademark Office*